United States Patent
Shah et al.

(10) Patent No.: US 7,180,825 B2
(45) Date of Patent: Feb. 20, 2007

(54) DOWNHOLE TELEMETRY SYSTEM FOR WIRED TUBING

(75) Inventors: Vimal V. Shah, Sugar Land, TX (US); Wallace R. Gardner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 284 days.

(21) Appl. No.: 10/879,408

(22) Filed: Jun. 29, 2004

(65) Prior Publication Data

US 2005/0285753 A1    Dec. 29, 2005

(51) Int. Cl.
H04H 9/00    (2006.01)

(52) U.S. Cl. .................. 367/82; 340/855.3; 340/853.7; 439/194; 439/577

(58) Field of Classification Search ................ 367/82; 340/855.3, 855.4, 853.7; 439/194, 577
See application file for complete search history.

(56) References Cited

U.S. PATENT DOCUMENTS

| | | | |
|---|---|---|---|
| 4,605,268 A | | 8/1986 | Meador |
| 6,252,518 B1 | * | 6/2001 | Laborde .................. 340/855.4 |
| 6,641,434 B2 | | 11/2003 | Boyle et al. |
| 6,657,551 B2 | * | 12/2003 | Huckaba et al. ......... 340/855.4 |
| 6,670,880 B1 | * | 12/2003 | Hall et al. .................. 336/132 |
| 6,757,551 B2 | * | 6/2004 | Newman et al. ......... 455/556.1 |
| 6,816,082 B1 | * | 11/2004 | Laborde .................. 340/853.3 |
| 2002/0101359 A1 | * | 8/2002 | Huckaba et al. ......... 340/854.9 |

FOREIGN PATENT DOCUMENTS

WO    WO0149001    7/2001

OTHER PUBLICATIONS

Grant Prideco, Inc., http://www.grantprideco.com/gptechnologies/IntelliPipe1.pdf.
Grant Prideco, Inc., http://www.grantprideco.com/gptechnologies/New%20Intellipipe%20SPE%202002.pdf.
Fay, J.B., et al., "Wired Pipes For A High-Data-Rate MWD System," Society Of Petroleum Engineers, Paper No. SPE 24971, Nov. 16-18, 1992, p. 95-104, Cannes, France.
Jellison, Michael J., et al., "Telemetry Drill Pipe: Enabling Technology For The Downhole Internet," Society Of Petroleum Engineers, Paper No. SPE 79885, Feb. 19-21, 2003, 10 pg., Amsterdam.

* cited by examiner

Primary Examiner—Albert K. Wong
(74) Attorney, Agent, or Firm—Conley Rose, P.C.

(57) ABSTRACT

A communications system employing discrete multi-tone ("DMT") modulated signals on a communications channel formed by inductively-coupled pipe. In one embodiment, the communications system includes a string of wired pipe joints that couple a transmitter to a receiver. Each pipe joint in the string possesses threaded ends configured for mechanically connecting with other pipe joints, a electrical or inductive coupler at each threaded end, and an insulated conductor that electrically connects the couplers. The transmitter and receiver communicate via DMT modulated signals transported by the wired pipe string. The system may further include multiple repeaters in the string. Each repeater may be configured to receive a DMT-modulated signal, to recover information from the DMT-modulated signal, and to re-transmit the information in the form of a DMT-modulated signal.

9 Claims, 5 Drawing Sheets

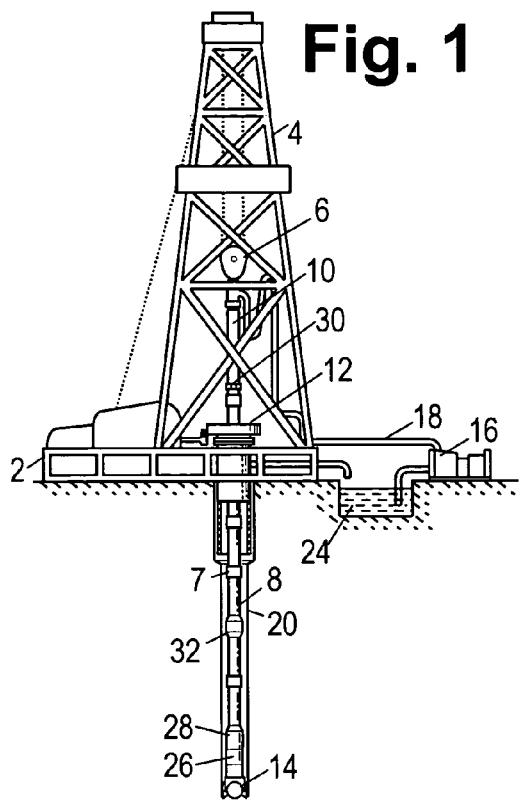
Fig. 1
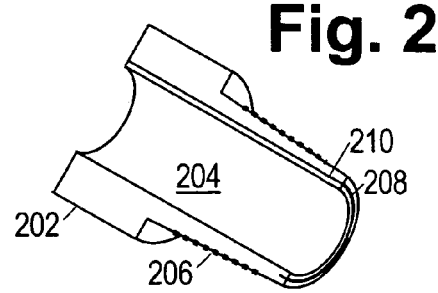
Fig. 2
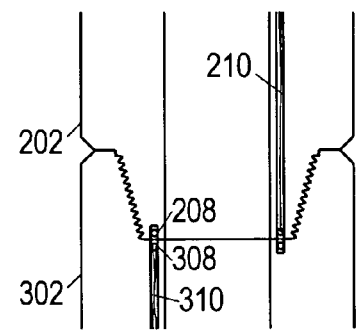
Fig. 3
Fig. 4
Fig. 5

DOWNHOLE TELEMETRY SYSTEM FOR WIRED TUBING

BACKGROUND

Modern petroleum drilling and production operations demand a great quantity of information relating to parameters and conditions downhole. Such information typically includes earth formation characteristics as well as information concerning the borehole itself. The methods that can be used to collect information downhole include: wireline logging, logging-while-drilling ("LWD"), and seismic imaging. After a well has been completed, downhole data collection may be performed by permanently emplaced sensors, by wireline logging, and by seismic monitoring.

In conventional wireline logging, a probe ("sonde") containing formation sensors is lowered into the borehole after some or all of the well has been drilled. The sonde's upper end is attached to a conductive wireline that suspends the sonde in the borehole. The conductive wireline transports power from the surface to the sonde's instrumentation, and transports information from the sonde's instrumentation to the surface. Wireline logging generally requires that the drill string or production tubing be removed from the borehole before logging can begin. Consequently, wireline logging cannot be performed during drilling or production operations.

In LWD, as the name suggests, data may be collected during the drilling process. Collecting and processing data during the drilling process eliminates the need to remove the drilling assembly to insert a wireline logging tool. LWD consequently provides the driller with better control, allowing performance optimization and minimizing downtime. Designs for measuring downhole conditions relating to the drilling assembly's movement and location have become known as "measurement-while-drilling" techniques, or "MWD". LWD generally concentrates more on the measurement of formation parameters, but the terms MWD and LWD often are used interchangeably. For the purposes of this disclosure, the term LWD will be used with the understanding that this term encompasses both the collection of formation parameters and the collection of information relating to the movement and position of the drilling assembly.

In LWD, the logging instrumentation is typically located at the lower end of the drill string. The instrumentation may operate, continuously or intermittently, to monitor predetermined drilling parameters and formation data. Some form of telemetry is then used to transmit the information to a surface receiver. Various telemetry systems exist, including mud pulse systems and systems that transmit acoustic signals through the drill string.

In seismic imaging, seismic waves are transmitted through earth formations and reflected from various boundaries and discontinuities. Seismic imaging involves stringing hundreds of listening devices on the surface or in a wellbore near a location where an understanding of the underground formations is desired. Once the listening devices have been placed, a disturbance is created to generate seismic waves. As these waves travel through the formations and encounter strata boundaries, some wave energy reflects back to the surface. With the appropriate processing of the received signals, a three-dimensional representation of the subsurface formations can be constructed.

The foregoing data collection methods are primarily used to locate and tap hydrocarbon reservoirs. Once a reservoir has been tapped, the goal becomes removing as much of the hydrocarbons from the reservoir as possible. Sensors may be emplaced in the wellbore to monitor pressure, temperature, fluid composition and inflow volumes. Wireline tools may be used to search for previously missed completion opportunities. Finally, long-term seismic monitoring may be employed to identify fluid migration patterns in and around the reservoir.

Information is the key to being profitable in the oil and gas industry. The more information one has regarding location and migration patterns of hydrocarbons within a hydrocarbon reservoir, the more likely it is that that reservoir can be tapped at its optimal location and utilized to its full potential. To this end, new and more sophisticated sensor arrangements are routinely created and placed downhole, so much so that existing telemetry techniques are becoming inadequate. For these reasons it would be desirable to have a communication technique that can support high speed communications between downhole sensors and a surface installation.

SUMMARY

Accordingly, there is disclosed herein a communications system employing discrete multi-tone ("DMT") modulated signals on a communications channel formed by inductively-coupled pipe. In one embodiment, the communications system includes a string of wired pipe joints that couple a transmitter to a receiver. Each pipe joint in the string possesses threaded ends configured for mechanically connecting with other pipe joints, a electrical or inductive coupler at each threaded end, and an insulated conductor that electrically connects the couplers. The transmitter and receiver communicate via DMT modulated signals transported by the wired pipe string. The system may further include multiple repeaters in the string. Each repeater may be configured to receive a DMT-modulated signal, to recover information from the DMT-modulated signal, and to re-transmit the information in the form of a DMT-modulated signal.

BRIEF DESCRIPTION OF THE DRAWINGS

For a detailed description of various invention embodiments, reference will now be made to the accompanying drawings in which:

FIG. 1 shows an illustrative drilling environment;

FIG. 2 shows a cut-away view of a drill pipe connector;

FIG. 3 shows a cross-sectional view of a connection between drill pipes;

FIG. 4 shows a first illustrative drill pipe wiring configuration;

FIG. 5 shows a second illustrative drill pipe wiring configuration;

Figure 6:
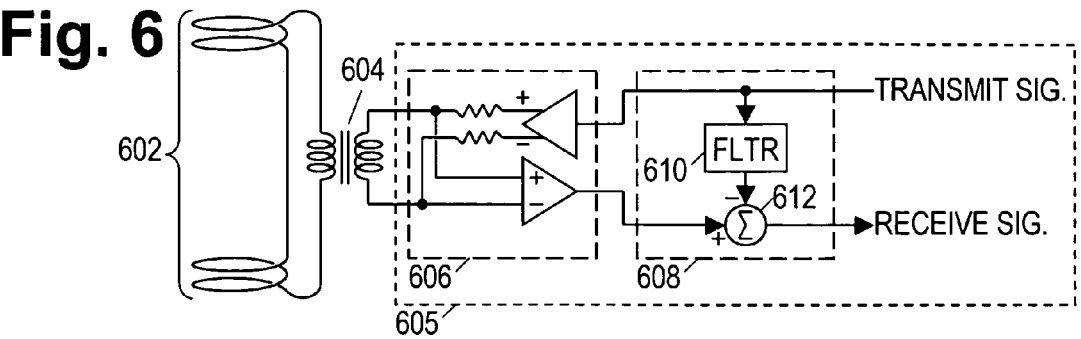
FIG. 6 shows a first illustrative repeater configuration.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system-components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The terms upstream and downstream refer generally, in the context of this disclosure, to the transmission of information from subsurface equipment to surface equipment, and from surface equipment to subsurface equipment, respectively. Additionally, the terms surface and subsurface are relative terms. The fact that a particular piece of hardware is described as being on the surface does not necessarily mean it must be physically above the surface of the Earth; but rather, describes only the relative location of the surface and subsurface pieces of equipment.

DETAILED DESCRIPTION

FIG. 1 shows an illustrative well during drilling operations. A drilling platform 2 is equipped with a derrick 4 that supports a hoist 6. Drilling of oil and gas wells is typically carried out with drill pipes connected together by "tool" joints 7 so as to form a drill string 8. The hoist 6 suspends a kelly 10 that is used to lower the drill string 8 through rotary table 12. Connected to the lower end of the drill string 8 is a drill bit 14. The bit 14 is rotated by rotating the drill string 8 or by operating a downhole motor near the drill bit. The rotation of the bit 14 extends the borehole.

Drilling fluid is pumped by recirculation equipment 16 through supply pipe 18, through drilling kelly 10, and down through the drill string 8 at high pressures and volumes to emerge through nozzles or jets in the drill bit 14. The drilling fluid then travels back up the hole via the annulus between the exterior of the drill string 8 and the borehole wall 20, through the blowout preventer (not specifically shown), and into a mud pit 24 on the surface. On the surface, the drilling fluid is cleaned and then recirculated by recirculation equipment 16. The drilling fluid cools the drill bit 14, carries drill cuttings to the surface, and balances the hydrostatic pressure in the rock formations.

Downhole instrument sub 26 may be coupled to a telemetry transmitter 28 that communicates with the surface to provide telemetry signals and receive command signals. A surface transceiver 30 may be coupled to the kelly 10 to receive transmitted telemetry signals and to transmit command signals downhole. Alternatively, the surface transceiver may be coupled to another portion of the rigging or to drillstring 8. One or more repeater modules 32 may be provided along the drill string to receive and retransmit the telemetry and command signals. The surface transceiver 30 is coupled to a logging facility (not shown) that may gather, store, process, and analyze the telemetry information.

The telemetry and command signals may be carried by electrical conductors embedded in the drill pipes. Couplers in the tool joints couple the electrical conductors of one drill pipe to the electrical conductors of the next drill pipe. Various coupling techniques have been proposed and are outlined in Michael J. Jellison, et al., "Telemetry Drill Pipe: Enabling Technology for the Downhole Internet," (SPE 79885) IADC/SPE Drilling Conference, Amsterdam, February 2003. The proposed coupling techniques include direct electrical connections and inductive coupling. Of particular interest to the present disclosure are inductively couplers.

FIG. 2 shows a cut-away view of a drill pipe connector (a "pin" end) 202. The drill pipe connector 202 has a central bore 204 surrounded by a tapered and threaded surface 206. At the end face of connector 202 is an inductive coupler 208 that surrounds the central bore 204. The inductive coupler 208 is electrically connected to an inductive coupler at the opposite end of the drill pipe by electrical conductors 210.

FIG. 3 shows a cross-sectional view of a tool joint formed by a pin end connector 202 and a mating "box end" connector 302. Inductive coupler 208 closely abuts a matching inductive coupler 308 in box end connector 302. Similar to inductive coupler 208, inductive coupler 308 is electrically connected to an inductive coupler at the opposite end by electrical conductors 310. The inductive couplers 208, 308, may be free from any azimuthal orientation requirements.

FIG. 4 illustrates a first wiring configuration that may be employed with the inductive couplers. The wiring for two drill pipes 402, 404, and adjoining connectors is shown. Drill pipe 402 has inductive couplers 408 and 410 at opposite ends. Coupler 408 matches with coupler 406 in an adjoining connector. Drill pipe 404 has inductive couplers 412 and 414 at opposite ends. Inductive coupler 412 matches with inductive coupler 410, while coupler 414 matches with coupler 416 in an adjoining connector. The symmetric nature of the wiring configuration allows for bi-directional communication.

To understand the operation of the FIG. 4 configuration, assume an alternating current "I" flows through inductive coupler 406. Inductive coupler 406 is a multi-turn coil that produces a magnetic field in response to the current flow. Inductive coupler 408 is a multi-turn coil that resides in this magnetic field. The magnetic field induces a current flow in inductive coupler 408, and the current is directed from coupler 408 to inductive coupler 410, where the process repeats. In one implementation, the signal loss at each tool joint is a small fraction of a decibel, allowing a signal to be communicated across many drill pipes before any boost or active enhancement is required.

FIG. 5 illustrates another wiring configuration that may be employed with the inductive couplers. The wiring for two drill pipes 502, 504, and adjoining connectors is shown. Drill pipe 502 has inductive couplers 508 and 510 at opposite ends. Coupler 508 matches with a coupler 506 in an adjoining connector. Drill pipe 504 has inductive couplers 512 and 514 at opposite ends. Inductive coupler 512 matches with coupler 510, while coupler 514 matches with coupler 516 in an adjoining connector. Again, the symmetric nature of the wiring configuration allows for bi-directional communication.

To understand the operation of the FIG. 5 configuration, assume an alternating current "I" flows through inductive coupler 506. Inductive coupler 506 is a toroid that induces an electric field (or, if surrounded by conductive material, a current density distribution) in response to the current flow. Inductive coupler 508 is a toroid that resides in this electric field (or current density distribution). The electric field (or current density distribution) induces a current flow in inductive coupler 508, and the current is directed from coupler 508 to coupler 510, where the process repeats. An illustrative implementation is provided in U.S. Pat. No. 4,605,268 ("Transformer Cable Connector").

A signal propagating through inductively-coupled wiring in a drilling string experiences losses from attenuation, impedance mismatches at the connectors, and imperfect coupling at the connectors. While these losses may be small for individual connectors and drill pipes, the cumulative losses may be significant enough to require the use of one or more repeaters, i.e., devices that receive and retransmit the information, thereby overcoming signal losses.

FIG. 6 shows one illustrative repeater configuration that could be used for inductively coupled drill pipe telemetry. A drill pipe 602 includes a repeater module 605 coupled to one or both of the electrical conductors by a-transformer 604. The repeater module 605 includes a hybrid 606 and an echo canceller 608. The hybrid 606 is an interface between a bi-directional channel (the electrical conductors of drill pipe 602) and two uni-directional channels. Hybrid 606 receives a transmit signal from echo canceller 608 and couples the transmit signal to transformer 604. Hybrid 606 further detects a receive signal from transformer 604, and provides the detected receive signal to echo canceller 608. Echo canceller 608 includes a filter 610 that generates an estimate of the interference caused by the transmit signal, and a summer 612 subtracts the estimated interference from the receive signal. Filter 610 may be implemented as an adaptive filter in accordance with well-known techniques such as those described in Haykin's *Adaptive Filter Theory* textbook.

Figure 7:
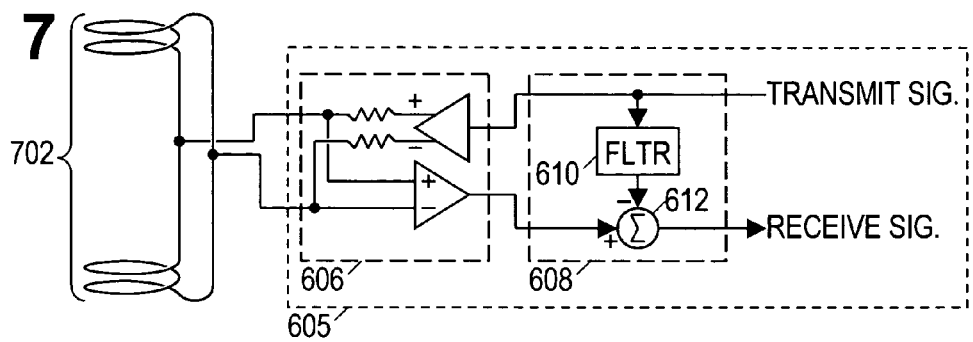
FIG. 7 shows a second illustrative repeater configuration.

The illustrative configuration of FIG. 6 uses transformer coupling between the repeater module 605 and the electrical conductors. FIG. 7 shows an alternative repeater configuration in which the repeater module 605 is electrically connected between the electrical conductors of a drill pipe 702. In both configurations, the electrical conductors are not terminated at the repeater module 605. This circumstance allows signals to propagate along the drill string and past the repeater. Such propagation may allow for continued communications (albeit at a reduced rate) even when a repeater fails.

Figure 8:
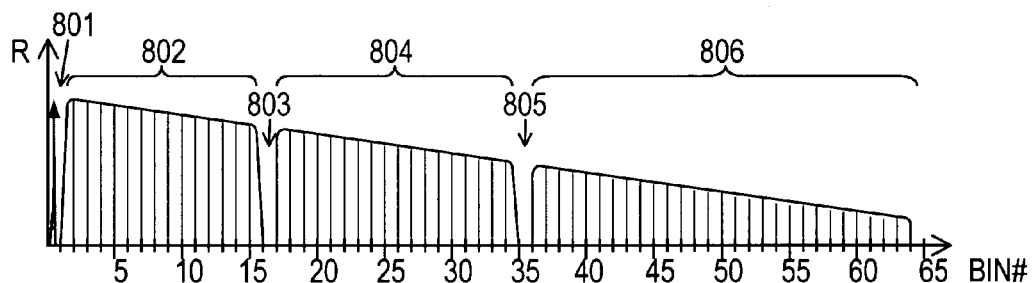
FIG. 8 shows illustrative receive signal spectra.

Repeater module 605 may include a transmitter and receiver configured to respectively send and receive discrete multi-tone ("DMT") modulated signals. (The operation of an illustrative transmitter/receiver ("transceiver") is discussed below in the description of FIG. 12.) FIG. 8 shows illustrative receive signal spectra for a channel that has been divided into three frequency bands. The channel bandwidth is divided into a large number of frequency "bins".) For illustrative purposes, FIG. 8 shows sixty four frequency bins (numbered 0–63), but a typical embodiment may be expected to have at least 256 or 512 bins.) The lowest frequency bin or bins 801 may be unused to avoid interference from power and other low-frequency electronic signals. The remaining bins may be divided into three (or more) bands 802, 804, and 806. Between the bands, one or more bins 803, 805 may be reserved as guard bands to simplify signal separation.

FIG. 8 shows an illustrative receive signal spectrum in each of three bands 802, 804, 806. Due to increased channel attenuation as a function of frequency, the higher-frequency bins may not support as high a bit rate as the lower bins. Accordingly, the higher-frequency bands may be allocated a greater number of bins than the lower-frequency bands.

Figure 9A:
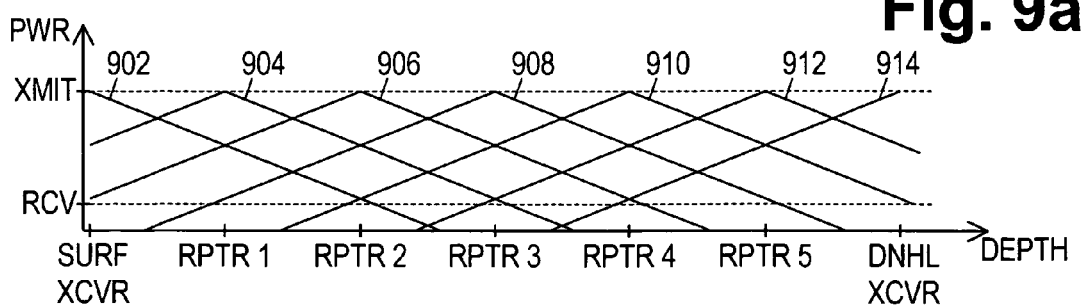
FIG. 9 shows an illustrative graph of signal strength versus position.

FIG. 9A shows a logarithmic graph of illustrative signal power as a function of position along the drill string. Seven positions along the drill string are identified: a surface transceiver, a downhole transceiver, and five intermediate repeaters. Two power levels are identified: a transmit power level, and a minimum receive power level. The surface transceiver transmits a signal 902 that attenuates as it propagates. The first repeater (RPTR1) receives signal 902 from the surface transmitter, and signal 906 from the second repeater (RPTR2). To avoid interference, the first repeater communicates with the surface transmitter in one frequency band, and communicates with the second repeater in a second frequency band. Information received from the surface transmitter in one frequency band is retransmitted in the second frequency band, and information received in the second frequency band is retransmitted in the first frequency band.

The first repeater transmits signal 904 which attenuates as it propagates in both directions. The second repeater receives signal 904 from the first repeater, and receives signal 908 from the third repeater (RPTR3). To avoid interference with signal 902 at the first repeater, the third repeater does not transmit any information in the first frequency band. Communications between the first and second repeater are carried out in the second frequency band, while communications between the second and third repeater are carried out in a third frequency band. Information received in the second frequency band (from the first repeater) is retransmitted in the third frequency band, while information received in the third frequency band (from the third repeater) is retransmitted in the second frequency band.

In like manner, the third repeater receives signals 906 and 910, communicating with the second repeater in the third frequency band, and communicating with the fourth repeater (RPTR4) in the first frequency band. The fourth repeater receives signals 908 and 912, communicating with the third repeater in the first frequency band and communicating with the fifth repeater (RPTR5) in the second frequency band. The fifth repeater receives signals 910 and 914, communicating with the fourth repeater in the second frequency band and communicating with the downhole transceiver in the third frequency band. The downhole transceiver receives signal 912, and communicates with the fifth repeater in the third frequency band.

The system may be designed so that the repeaters can detect signals from non-adjacent repeaters or transceivers. Thus, for example, the third repeater may be able to detect signals from not only the second and fourth repeaters, but also from the first and fifth repeaters. The signals from more distant sources may be typically overwhelmed by transmissions from nearby sources, but such a design may allow communications to be maintained even if a repeater-fails.

Figure 9B:
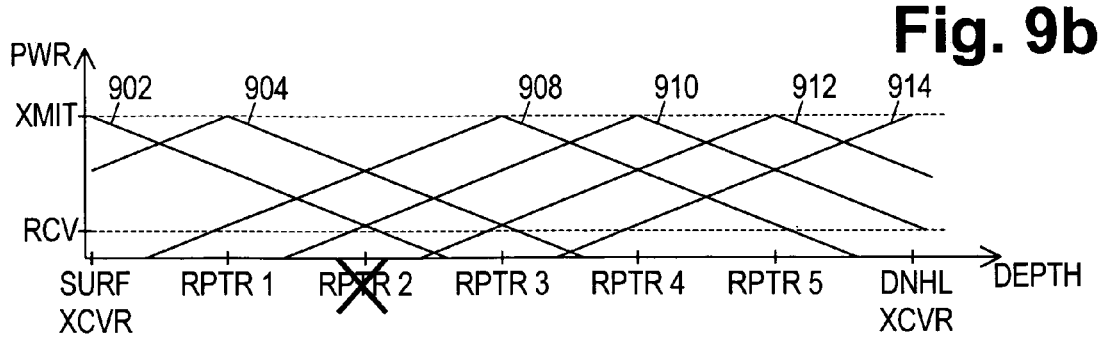

Thus, for example, FIG. 9B shows an illustrative graph of logarithmic signal power as a function of position when the second repeater has failed. For communications to be successful, the system should now avoid interference between signals 904, 910, and 912. In one embodiment, the system disables the fourth repeater, and uses three frequency bands for communication as before. (E.g., a first frequency band for communications between the surface transceiver and the first repeater, a second frequency band for communications between the first and third repeaters, a third frequency band for communications between the third and fifth repeaters, and the first frequency band for communications between the fifth repeater and the downhole transceiver.)

In another embodiment, the system reallocates the channel bandwidth to avoid interference and maximize the data rate past the failed receiver. The failed receiver creates a "bottleneck" in the system. The communications between the first and third repeaters are limited by channel attenuation, so it does little good to have large data rates between the other repeaters and transceivers. Accordingly, a somewhat larger bandwidth may be allocated for communications past the failed repeater, and those communications may take place in the frequency band with the smallest attenuation (typically the lowest frequency band). Hereafter, this bandwidth and frequency allocation is referred to as "channel 1". Three other channels (channels 2, 3, and 4), are also allocated for communications between other repeaters and transceivers. Compared with the three frequency bands used for the system of FIG. 9A, it may be anticipated that channel 1 will have a significantly larger bandwidth, and channels 2–4 will have significantly smaller bandwidths.

Since channel 1 has been allocated for communication between the first and third repeaters, this is the starting point for assigning channels. Channel 4 may be used for communications between the surface transceiver and the first repeater. Channel 2 may be used for communication between the third and fourth repeaters, channel 3 may be used for communication between the fourth and fifth repeaters, and channel 4 may be used for communication between the fifth repeater and the downhole transceiver.

Figure 10:
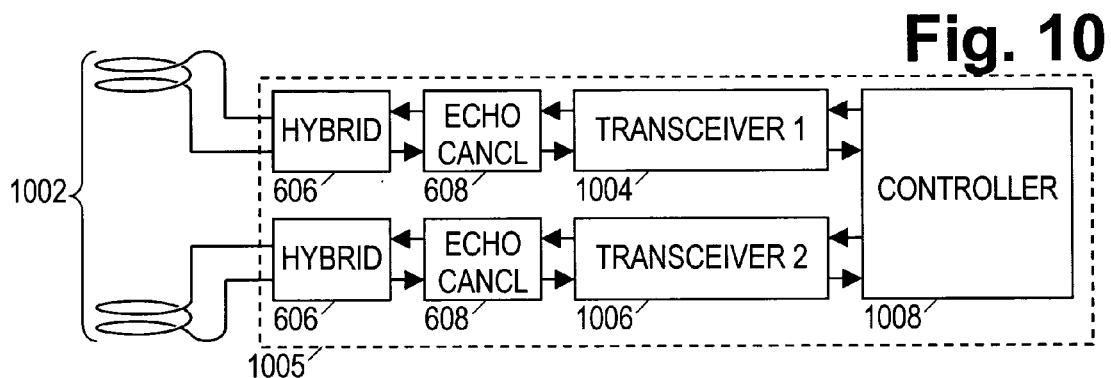
FIG. 10 shows a third illustrative repeater configuration.

The repeater configurations of FIGS. 6 and 7 offer robustness, i.e., the ability for the system to continue operating even if a repeater fails. The trade-off for this robustness is a need for time division multiplexing, frequency division multiplexing, or code division multiplexing to avoid interference between the transmit signals of different repeaters. FIG. 10 shows a configuration that isolates the signals from different repeaters so that the full channel bandwidth may be used at each stage of the pipeline.

FIG. 10 shows a drill pipe 1002 having a repeater module 1005 connected to couplers at opposite ends of the drill pipe. Each coupler is connected to a respective hybrid 606, which in turn is coupled to corresponding echo canceller 608 and a corresponding transceiver 1004, 1006. A controller 1008 interfaces to each transceiver 1004, 1006, and controls the information flow in both directions. Controller 1008 may be additionally coupled to various sensors (not shown) to detect drilling fluid and well bore conditions around the repeater. Controller 1008 may insert measurements from such sensors into the information flowing to the surface. Controller 1008 may further detect commands in the information stream flowing downhole and may adjust its operation in response to such commands.

Figure 11:
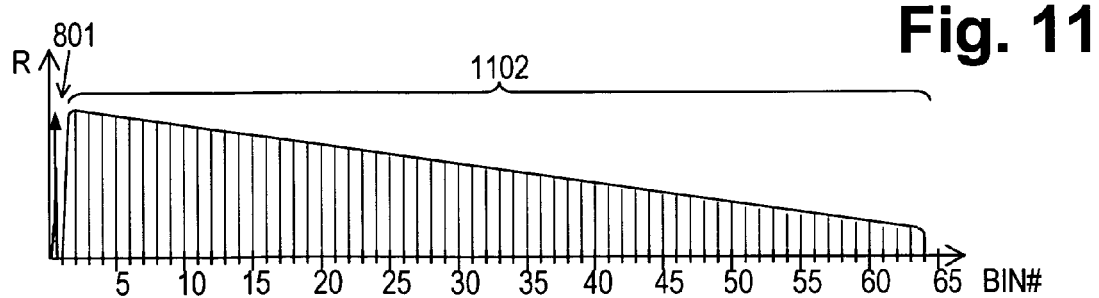
FIG. 11 shows a receive signal spectrum for the repeater of FIG. 10.

Each of the transceivers 1004, 1006, may be configured to transmit and receive DMT-modulated signals. FIG. 11 shows an illustrative receive spectrum that may be supported by the repeater configuration of FIG. 10. The channel bandwidth is divided into many equally-space frequency bins, and the lowest frequency bin(s) may be left unused to avoid interference from nearby power signals. The remainder of the bins are grouped into a single channel band that can be used for bi-directional communication.

As mentioned previously, the illustrative telemetry system transports information using discrete multi-tone (DMT) modulation. DMT modulation is commonly employed in Asymmetrical Digital Subscriber Line (ADSL) systems, so a wealth of detail on DMT implementation is available in the ADSL literature. DMT modulation divides the frequency spectrum into many adjacent frequency bins (see, e.g., FIGS. 8 and 11). In the ideal case, frequency bin, would have the same data transmission rate as all the other frequency bins. However, the data rate for each bin depends on various factors. For example, interference having a particular frequency may affect bins centered near the frequency of the noise source. The affected bins will have lower signal to noise ratios and therefore their data carrying capacity will be lower than other bins. Another factor affecting data rates may be the frequency-dependent attenuation of the electrical conductors, which, due to capacitive effects, generally exhibit a smoothly increasing attenuation at higher frequencies. Other system components, such as transformers or imperfect impedance-matching connectors, may further aggravate attenuation at selected frequencies. ADSL systems generally include mechanisms for adjusting the data transmission rate for each bin to optimize the reliable data transmission rate.

In an inductively coupled pipe, the regularly spaced couplers create reflections and standing waves due to impedance mismatches. These reflections affect the transmission spectrum of the channel, creating many narrow pass bands and stop bands. DMT modulation techniques are particularly useful for exploiting the full channel capacity. DMT modulation allows the allocation of data to specific frequency bands (e.g., more data to bands having low attenuation, and little or no data to bands having high attenuation). In general, the width of the DMT frequency bands is inversely proportional to the DMT symbol length, so finer control of frequency usage is provided by longer DMT-symbols.

The length of the channel's impulse response may be used as a practical guide to determining a desirable DMT symbol length. It is desirable to make the DMT symbol substantially longer than the length of the impulse response (or at least the length of the non-negligible part of the impulse response). It may be desirable to employ DMT-symbols having lengths of 1024 or 2048 samples (not including the cyclic prefix). Such symbol lengths offer substantially reduced inter-symbol interference (ISI) relative to high bandwidth QAM signaling.

Also, the allocation of data to frequency bands is extremely flexible, making DMT modulation particularly adaptive to changing channel conditions. As the pipe string endures compressional and torsional loads, the couplers may experience coupling and/or impedance changes. DMT transceivers can quickly alter data allocations to maintain data rates in the face of such channel changes. The flexibility of DMT transceivers extends also to overall data rates, which may be adjusted as changes occur to the channel. If one or more repeaters fail, the remaining repeaters and transceivers can attempt to bypass the failed repeater(s) with no significant alteration of their communications algorithms. Such flexibility greatly enhances the reliability of the communications system.

Figure 12:
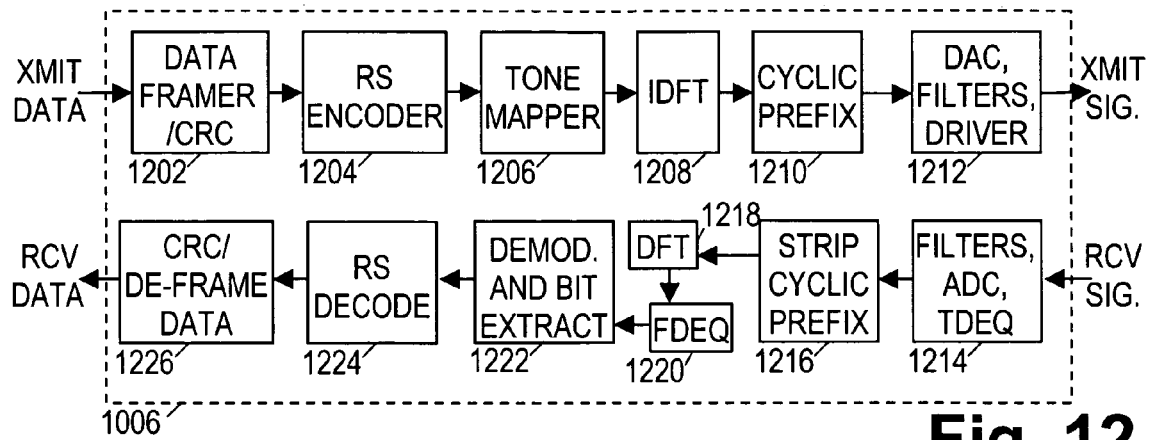
FIG. 12 shows a block diagram of an illustrative discrete multi-tone ("DMT") transceiver.

FIG. 12 shows an illustrative transceiver 1006, having a transmitter chain and a receiver chain. The transmitter chain includes a data framer 1202, an error correction encoder 1204, a tone mapper 1206, an inverse Discrete Fourier Transform (IDFT) block 1208, a cyclic prefix generator 1210, and a line interface 1212. The receiver chain includes a line interface 1214, a cyclic prefix stripper 1216, a Discrete Fourier Transform (DFT) block 1218, a frequency domain equalizer 1220, a demodulation and bit extraction block 1222, an error correction decoder 1224, and a CRC/deframing block 1226.

In the transmitter chain, data framer 1202 groups bytes of uplink data together to form data frames. The data frames are then grouped together with a synchronization frame and a cyclic redundancy code (CRC) which is calculated from the contents of the data frames. The CRC provides one means for detecting errors in data received at the receiving end. An error correction encoder 1204 processes the data frames to add redundancy to the data stream. The redundancy may be used to detect and correct errors caused by channel interference. A Reed-Solomon (RS) code is suitable, but other error correction codes may be used.

Tone mapper 1206 takes bits from the data stream and assigns them to frequency bins. For each frequency bin, the bits are used to determine a Discrete Fourier Transform (DFT) coefficient that specifies a frequency amplitude. The number of bits assigned to each frequency bin is variable (i.e., the number may be different for each bin) and dynamic (i.e., the number may change over time), and the number depends on the estimated error rate for each frequency. Microcontrollers or software (not specifically shown) at each end cooperate to determine the error rate detected by the receiver in each frequency band, and to adjust the tone mapper accordingly.

The coefficients provided by the tone mapper 1206 are processed by IDFT block 1208 to generate a time-domain signal carrying the desired information at each frequency. Cyclic prefix block 712 duplicates the end portion of the time-domain signal and prepends it to the beginning of the time domain signal. As discussed further below, this permits frequency domain equalization of the signal at the receiving end. The signal-with-prefix is then converted into analog form, filtered, and amplified for transmission across the communications channel by line interface 1212.

In the receiver chain, line interface 1214 filters the received signal, converts it to digital form, and performs any desired time domain equalization. The time domain equalization at least partially compensates for distortion introduced by the channel, but it is likely that at least some intersymbol interference will remain. Stripper block 1216 removes the cyclic prefixes that were added by the source's prefix block (the counterpart of block 1210), but trailing intersymbol interference from the cyclic prefix remains in the signal. DFT block 1218 performs a DFT on the signal to obtain the frequency coefficients. If desired, frequency domain equalization may be performed by block 1220 to compensate for the remaining intersymbol interference. It is noted that frequency domain equalization on DFT coefficients is a cyclic convolution operation which would lead to incorrect equalization results had the cyclic prefix not been transmitted across the channel.

Block 1222 extracts the data bits from the frequency coefficients using an inverse mapping of the source's tone mapper (counterpart to mapper 1206). Decoder 1224 decodes the data stream correcting such errors as are within its correcting ability. De-framer 1226 then identifies and removes synchronization information, and determines if the CRC indicates the presence of any errors. If error free, the data is forwarded to the output. Otherwise, the controller is notified of errors in the data.

Figure 13:
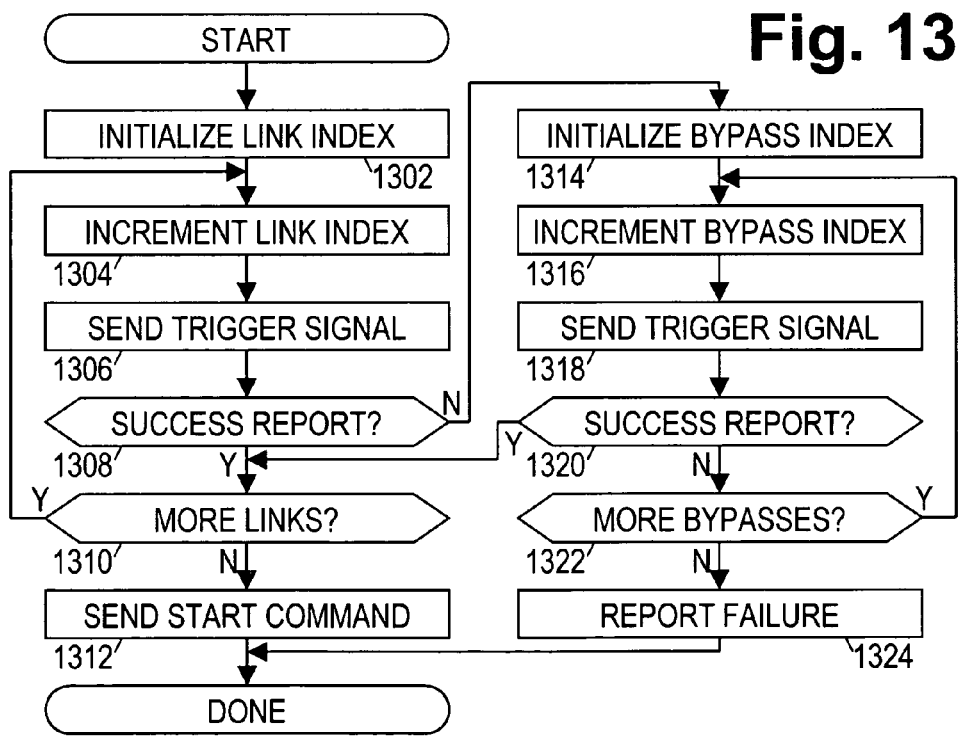
FIG. 13 shows an illustrative method that may be used to establish a multi-link communications path.

FIG. 13 shows an illustrative method which may be implemented by the surface transceiver's controller to initialize the various transceivers (hereafter, the term "transceiver" includes any repeaters) and establish a complete communications path between the surface and downhole transceivers. Each link between transceivers is assigned a unique index and a correspondingly unique trigger signal. The trigger signal may be a tone or combination of tones that are used to alert the appropriate transceivers to establish contact over the link. In one implementation, the index is a binary word with a bit for each transceiver. The link is then identified by setting two of the bit values to "1", namely, the two bit values associated with the transceivers at the ends of the link. The trigger signal may then be a pair of tones, each tone indicating one of the transceivers.

Beginning in block 1302, the controller sets the link index to some initial value. Thereafter, as the link index is incremented in block 1304, the link index will cycle through the links between transceivers from the surface to the bottom hole assembly. In block 1306, the surface transceiver sends the corresponding trigger signal. After sending the trigger signal, the controller will either receive a report of successful training, or will time-out after waiting a predetermined time. In block 1308, the controller tests to determine whether a success report was received. If so, the controller tests in block 1310 to determine if more links need to be established. If more links need to be established, the controller returns to block 1304. Otherwise, the controller transmits a start command in block 1312 to complete the communications path.

If in block 1308, the controller determines that no success report was received, the controller attempts to establish a bypass link beginning in block 1314. In block 1314, the controller sets the bypass index to some initial value. Thereafter, as the bypass index is incremented in block 1316, the bypass index will cycle through bypass links from the last successful link to the bottom hole assembly. As with the link index, the bypass index may be implemented as a binary word with a bit for each transceiver. The bypass link is identified by setting two non-adjacent bit values to "1", namely, the two bit values associated with the transceivers at the end of the bypass link. The trigger signal for bypass links may be implemented in the same fashion as before.

In block 1318, the controller transmits a trigger signal for the bypass link. After sending the trigger signal, the controller will either receive a report of successful training, or will time-out after waiting a predetermined time. In block 1320, the controller tests to determine whether a success report was received. If so, the controller returns to block 1310. Otherwise, the controller in block 1322 tests to determine whether anymore bypass links may be attempted. If so, the controller returns to block 1316. Otherwise, the controller reports the failure to establish a complete communications path in block 1324.

Figure 14:
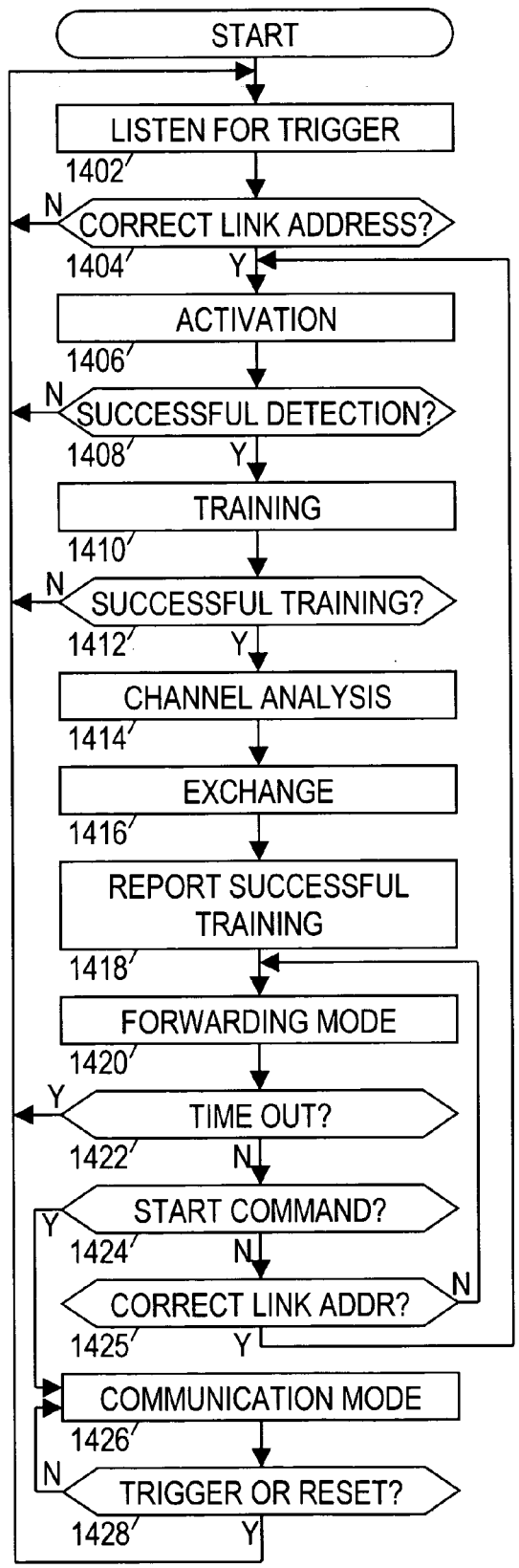
FIG. 14 shows an illustrative method that may be used to establish individual communication links.

FIG. 14 shows an illustrative method which may be implemented by the controllers of each of the transceivers (including the surface transceiver). In block 1402, the controller waits for a trigger signal. In block 1404, the controller determines whether the trigger signal identifies one of the links or bypass links associated with the transceiver. If the transceiver is not associated with the identified link, the controller returns to block 1402. Otherwise, the controller enters an activation phase in block 1406.

Assuming that both of the transceivers associated with a link have received the trigger signal, both transceivers will be in the activation phase. In the activation phase, each of the two transceivers transmit single tones to establish contact and determine which one will control the timing on the link. In block 1408, the transceivers individually determine whether the other transceiver has been successfully contacted, and if not, the transceivers revert to the listening mode in block 1402.

If contact has been established, the transceivers exchange wideband signals in block 1410. The wideband signals allow each unit to calculate the received power spectral density, to adjust automatic gain controls, and to perform initial training of the equalizers in each receiver. A quiet period may also be provided to allow each transceiver to determine line noise or to train echo cancellation equalizers. In block 1412, the transceivers determine whether training has been successfully completed, and if not, they revert to the listening state in block 1402.

If training is successful, the transceivers provide each other with basic information in block 1414. The basic information includes capabilities of each receiver and proposed data rates. Additional training signals are also sent to permit further equalization training. In block 1416, the transceivers may exchange information regarding channel measurements, desired data rates, and other configuration parameters to be used for subsequent communications.

Once the communication parameters have been exchanged, transceivers in block 1418 each transmit a signal indicating that communications have been successfully established. The transceivers then enter a forwarding mode in block 1420. In the forwarding mode, each transceiver listens for trigger signals and success reports. Upon receiving either, a transceiver in forwarding mode re-transmits the trigger signal or success report. To avoid unduly replicating the trigger signals or success reports, each transceiver will ignore any trigger signals or success reports received within a predetermined interval after re-transmitting such a signal.

Each transceiver that enters the forwarding mode will exit from the forwarding mode for any of the following: the expiration of a predetermined delay, reception of a start command, or receipt of a trigger signal identifying a link associated with that transceiver.

In block 1422, the transceiver determines whether the predetermined time has expired, and if so, the transceiver reverts to the listening state in block 1402. Otherwise, in block 1424, the transceiver determines whether a start command has been received. If so, then the transceiver enters a communications mode in block 426. Otherwise, in block 1425, the transceiver determines whether an associated trigger signal has been received. If so, the transceiver transitions to block 1406. If not, the transceiver re-enters the forwarding mode 1420.

In block 1426, the transceivers begin communicating over the links, translating messages between frequency bands and re-transmitting as described above with reference to FIGS. 9A–9B. Upon losing power or receiving a trigger signal, the transceiver exits the communication mode. In block 1428, the transceiver determines whether a trigger signal has been received, and if so, reverts to the listening state in block 1402.

The systems and method disclosed herein are expected to provide reliable, high-data-rate communications with downhole sensors. Such communications are expected to greatly enhance overall safety by quickly alerting drillers to downhole conditions, including sudden fluid influxes and critical pore pressure information, both of which relate to blowout prevention. Such information may make near-balanced drilling feasible and safe, allowing for much more economical drilling operations.

The above discussion is meant to be illustrative of the principles and various embodiments of the present invention. Numerous other variations and modifications will become apparent to those skilled in the art once the above disclosure is fully appreciated. It is intended that the following claims be interpreted to embrace all such variations and modifications.

What is claimed is:

1. A communication system that comprises:
    a string of wired pipe joints, each pipe joint having:
        ends to mechanically connect with other pipe joints;
        a coupler at each end to provide electrical or inductive coupling with a coupler in a connected pipe joint; and
        an insulated conductor that electrically connects the couplers;
    a transmitter coupled to one end of the string to generate a DMT-modulated signal;
    a receiver coupled to an opposite end of the string to receive and demondulate a DMT-modulated signal; and
    at least one repeater, each repeater coupled between wired pipe joints in the string, wherein each repeater receives a DMT-modulated signal, recovers information from the DMT-modulated signal, retransmits the information in the form of a DMT-modulated signal,
    wherein each repeater recovers information from one frequency band of the received DMT-modulated signal, and modulates the information in a different frequency band of the transmitted DMT-modulated signal.

2. The system of claim 1, wherein information communicated from transmitter to receiver is modulated by the transmitter and each repeater in a corresponding one of three or more frequency bands.

3. A communications system that comprises:
    a string of wired pipe joints, each pipe joint having:
        ends to mechanically connecting with other pipe joints;
        a coupler at each end to provide electrical or inductive coupling with a coupler in a connected pipe joint; and
        an insulated conductor that electrically connects the couplers;
    a transmitter coupled to one end of the string to generate a DMT-modulated signal;
    a receiver coupled to an opposite end of the string to receive and demodulate a DMT-modulated signal; and
    a repeater coupled between wired pipe joints in the string, wherein the repeater receives a DMT-modulated signal, recovers information from the DMT-modulated signal, and retransmits the information in the form of a second DMT-modulated signal, and wherein the repeater includes:
        ends to mechanically connect with other pipe joints;
        a coupler at each end to provide electrical or inductive coupling with a coupler in a connected pipe joint;
        an insulated conductor within the repeater that electrically connects the couplers of the repeater; and
        a transceiver in electrical communication with couplers of the repeater via the insulated conductor of the repeater.

4. The system of claim 3, wherein the insulated conductor transports a signal between couplers when the repeater fails.

5. A communications method for use in a system having inductively coupled pipes as a communications channel, the method comprising:
    employing DMT modulation to create a transmit signal;
    sending the transmit signal via said communications channel;
    receiving and demodulating the transmit signal to obtain transmit data from a set of frequencies in a first frequency band; and using DMT modulation to create a second transmit signal having the transmit data in a second set of frequencies in a different frequency band.

6. The method of claim 5, further comprising:

sending the second transmit signal via the communications channel.

7. The method of claim 6, further comprising:

receiving and demodulating the second transmit signal to obtain the transmit data from the second frequency band; and using DMT modulation to create a third transmit signal having the transmit data in a third frequency band different from the first and second frequency bands.

8. The method of claim 7, further comprising:

sending the third transmit signal via the communications channel.

9. The system of claim 1, wherein the repeaters are separated by multiple pipe joints.

\* \* \* \* \*